Feb. 11, 1947. C. A. PORTER 2,415,530
ISOBUTANE PRODUCTION
Filed March 8, 1943
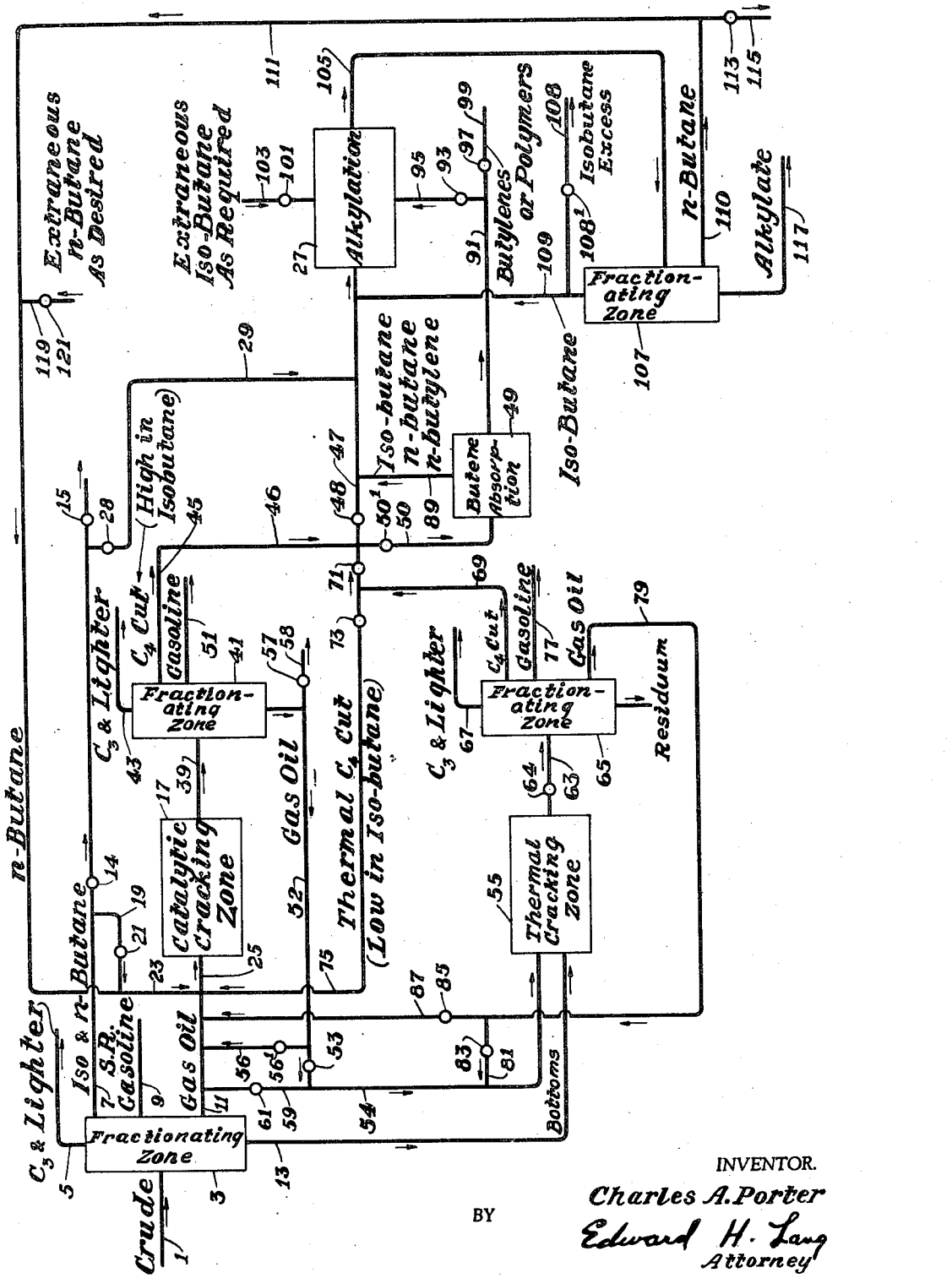
INVENTOR.
Charles A. Porter
BY Edward H. Lang
Attorney Patented Feb. 11, 1947

2,415,530

UNITED STATES PATENT OFFICE 2,415,530

ISOBUTANE PRODUCTION

Charles A. Porter, Evanston, Ill., assignor to The Pure Oil Company, Chicago, Ill., a corporation of Ohio Application March 8, 1943, Serial No. 478,451

3 Claims. (Cl. 196—49)

This invention relates to method and apparatus for producing hydrocarbons of gasoline boiling range and is more particularly concerned with a unitary process for converting crude oil into high anti-knock gasoline boiling hydrocarbons suitable for use as aviation motor fuel.

Various processes are known and are in use for converting hydrocarbon gases into iso-paraffins boiling within the gasoline boiling range by a process known as "alkylation." Probably the best known alkylation process in commercial use is that involving reaction between iso-butane and butylene in the presence of concentrated sulfuric acid of about 88% to 100% sulfuric acid concentration. Other known methods are those involving use of hydrofluoric acid as catalyst and the use of aluminum chloride and hydrogen chloride.

In many refineries in which alkylation is practiced it is necessary to also practice isomerization of normal butane in order to furnish sufficient iso-butane for the alkylation process. The isomerization process generally involves treatment of normal butane by contacting it with a catalyst consisting of catalytic clay or other solid absorbent impregnated with aluminum chloride, in the presence of hydrogen chloride.

My invention is designed to eliminate the necessity for using a separate step for isomerizing normal butanes. Many large refineries today are equipped with catalytic cracking plants for converting heavier hydrocarbons into hydrocarbons of gasoline boiling range. Among the catalytic processes that are in use are the stationary bed type represented by the Houdry process; the fluid catalyst type in which solid comminuted catalyst is suspended in the vapor stream undergoing cracking as represented by the process developed by Standard Development Company; and the moving bed catalyst type developed by Socony Vacuum. In all three types of processes the catalyst generally used is either a natural clay or silicate having catalytic properties, usually treated in some manner to activate it, or a synthetic aluminum silicate or alumina-silica composition. The motor fuel produced by these catalytic processes particularly when operated within temperature ranges of 800° to 950° F. is characterized by a high content of isoparaffins.

I have discovered that if normal butane is charged to a catalytic cracking unit together with the heavier hydrocarbons to be converted to gasoline boiling hydrocarbons, the gases formed in the reaction contain a high percentage of iso-butane. The net result of the reaction is cracking of higher boiling hydrocarbons to lower boiling hydrocarbons and conversion of butane to iso-butane. Thus, by recycling the exit gases from an alkylation unit to a catalytic cracking unit, the necessity for producing additional iso-butane by a separate isomerization step is obviated.

My invention contemplates a unitary process in which crude mineral oil is fractionated into its various components such as C₃ and lighter gases, a C₄ cut, gasoline, gas oil, and bottoms; the gas oil and bottoms are subjected to cracking in catalytic and thermal cracking units respectively; a C₄ cut is separated from the products of each cracking operation; the C₄ cut from the thermal cracking step is charged to the catalytic cracking step; the C₄ cut from the catalytic cracking step is charged to the alkylation unit either directly or with an intermediate butene absorption step; and the normal butane fractionated out of the reaction products from the alkylation unit and recycled to the catalytic cracking unit. The invention also contemplates some variation in the steps above outlined.

An object of my invention is to provide a method for converting heavier hydrocarbons into hydrocarbons of motor fuel boiling range.

Another object of my invention is to provide apparatus for converting heavier hydrocarbons into hydrocarbons of motor fuel boiling range.

A further object of my invention is to provide a method for operating a cracking unit and alkylation unit in combination in such manner as to supply required amounts of iso-paraffins and olefins to the alkylation unit.

A still further object of my invention is to provide a unitary process for converting crude mineral oil into high anti-knock gasoline suitable for use as aviation motor fuel.

Still another object of my invention is to provide a method for supplying required amounts of iso-butane to an alkylation plant.

Other objects of my invention will become apparent from the following description and the accompanying drawing of which the single figure is a diagrammatic flow sheet of the various steps involved.

Referring to the drawing the numeral I indicates a line through which crude mineral oil is charged to a fractionating zone 3 in which the crude oil is fractionated in conventional manner into its various components. C₃ and lighter gases are removed overhead through line 5. The B—B cut consisting chiefly of iso and normal butanes is removed as a side stream through line 7 from the upper portion of the fractionating zone. Gasoline is removed as a side stream through line 9 from an intermediate portion of the fractionating zone. Gas oil is removed as a side stream through line 11 from the lower portion of the fractionating zone and bottoms are withdrawn from the bottom of the fractionating zone through line 13. The C₃ and lighter fraction may be used as fuel or may be subjected to further fractionation to recover C₃ and C₂ hydrocarbons for further processing. The B—B cut may be eliminated from the system through valves 14 and 15; or it may be charged to the catalytic cracking zone 17 through line 19, valve 21, line 23 and line 25; or it may be charged to the alkylation zone 27 through valve 28 and line 29. The B—B cut may be divided and any portion sent to any one of the three places mentioned.

The straight run gasoline withdrawn through line 9 is sent to storage and may be used for blending with the gasoline fractions obtained from other units of the process or may be subjected to thermal or catalytic reforming in order to increase its octane number prior to blending.

The gas oil fraction withdrawn through line 11 is preferably charged to catalytic cracking unit 17 wherein it is cracked by any of the above mentioned catalytic cracking processes. If desired the gas oil may be separated in fractionating zone 3 into two or more fractions, according to boiling range and any desired fraction charged to either the thermal or catalytic cracking zone. The reaction products leave the catalytic cracking unit 17 through line 39 and pass into fractionating zone 41 in which fractionation of the reaction products into $C_3$ and lighter gases, $C_4$ cut, gasoline and gas oil is effected. $C_3$ and lighter gases are eliminated through line 43 and may be disposed of in the same manner as the $C_3$ and lighter gases removed from fractionating zone 3. The $C_4$ cut, which is rich in isobutane, passes through line 45 into line 46 from which it may be sent directly to the alkylation unit 27 through line 47 and valve 48 or to the butene absorption unit 49 through line 50 and valve 50'; or a portion sent to each unit. The gasoline, rich in iso-paraffins, is withdrawn from the fractionating zone through line 51. This gasoline or selected portions thereof, after suitable treatment, may be used as base stock for aviation gasoline. Gas oil is withdrawn from fractionating zone 41 through line 52 and passes through valve 53 into line 54 and thence, preferably, into thermal cracking unit 55. A portion or all of the gas oil from line 52 may be recycled through line 56 and valve 56' to the catalytic cracking unit or withdrawn from the system through valve 57 and line 58.

Although it is preferred to charge the gas oil from fractionating zone 3 to catalytic cracking unit 17, selected portions or fractions of this gas oil may be charged through line 59 and valve 61 into thermal cracking unit 55.

The thermal cracking unit 55 may be a conventional type combination thermal cracking unit operating under superatmospheric pressure, having separate coils for cracking bottoms and gas oil. The bottoms withdrawn from fractionating zone 3 through line 13 are preferably cracked under elevated pressure and temperatures of the order of 700° to 850° F. in order to vis-break the bottoms and convert a large portion thereof to gas oil suitable for recycling to either cracking unit. The gas oil charged to the thermal cracking zone may be cracked at either low or high super-atmospheric pressures and at temperatures ranging from approximately 850° to 1100° F. The reaction products from the thermal cracking unit 55 are withdrawn through line 63 and valve 64 and charged to fractionating zone 65. $C_3$ and lighter gases are withdrawn from the fractionating zone 65 through line 67 and are disposed of in the manner described in connection with $C_3$ and lighter gases from fractionating zone 3. A $C_4$ cut containing normal butane, iso-butane, normal butenes and iso-butenes is withdrawn from fractionating zone 65 through line 69 and charged either to the alkylation unit 27 through valves 71 and 48 and line 47; or to the butene absorption unit 49 though valves 71 and 50' and line 50; or to the catalytic cracking unit 17 through valve 73 and line 75; or it may be divided and any portion sent to any of the three mentioned units. The route which the $C_4$ cut will take will depend on its composition and the balance between butenes and iso-butanes. Gasoline is withdrawn from fractionating zone 65 through line 77 and is sent to storage. This gasoline may or may not be blended with gasoline separated from other portions of the process depending on the use for which the gasoline is intended. Gas oil is withdrawn from fractionating zone 65 through line 79 and is recycled either to the thermal cracking zone 55 through line 81 and valve 83; or is charged to the catalytic cracking unit through valve 85 and line 86; or is divided and a portion sent to each unit.

Instead of charging the $C_4$ fractions from the several steps of the process directly to the alkylation unit 27 it may be desirable to charge these fractions to the butene absorption zone 49 in order to separate a portion or all of the butenes from the butanes. This may be accomplished in known ways as for example by absorption in either cold or hot 65% to 70% sulfuric acid; or by means of cuprous halide suspended in an inorganic solvent such as kerosene; or by means of selective solvent such as pyridine, aniline, chlorophenol, ethylene glycol, and dichlorethyl ether under pressure. It will be apparent that the absorbed butenes must be separated from the absorption medium prior to charging to the alkylation zone. Where cold sulfuric acid is used as the absorption medium the absorbed butenes may be subsequently polymerized by heating to temperatures of approximately 200° F. The resulting olefinic polymers readily separate from the acid and may be charged to the alkylation zone in the form of the polymer or may be used for other purposes.

The unabsorbed butanes are removed from absorption unit 49 through line 89 and are charged to the alkylation unit 27. The butenes or butene polymers absorbed in and separated from the absorption medium are charged through line 91, valve 93 and line 95 to the alkylation unit 27. Any excess of butene or butene polymers may be withdrawn through valve 97 and line 99. In the event there is an excess of butenes or butene polymers over iso-butane, instead of withdrawing the olefins, extraneous iso-butane may be introduced into the alylation unit through valve 101 and line 103. Alkylation is effected in known manner by any of the processes previously mentioned. The reaction products from the alkylation zone are withdrawn through line 105 and charged to fractionating zone 107 where they are separated into alkylate, normal butane and iso-butane fractions. The iso-butane fraction is recycled from fractionating zone 107 through line 109 back to alkylation unit 27. Exess iso-butane may be withdrawn from the system through line 108 and valve 108'. Normal butane is withdrawn from fractionating zone 107 through line 110 and is charged to the catalytic cracking zone 17 through line 111. A portion or all of the normal butane withdrawn through line 110 may be eliminated from the system through valve 113 and line 115. Alkylate is withdrawn from the fractionating zone through line 117 and after suitable treatment, as for example neutralization with alkali solution, it is sent to storage for blending with other stocks to make finished aviation motor fuel. Extraneous butane may be introduced into the system for processing through line 119 and valve 121.

In describing my invention provision has been made for separating butenes from butanes in absorption zone 49. Ordinarily, in operating the process, this separation will not be necessary since the process is designed to produce sufficient iso-butanes to alkylate the butenes produced. However it may be desirable to separate butenes or butene polymers for extraneous use, as for example, the manufacture of iso-octane or alcohol; or it may be desirable to prepare charging stock for a butadiene plant or a butyl rubber plant. In such case, the isobutene and/or normal butene or a portion of both may be removed before charging the $C_4$ fractions to the alkylation unit.

Even when it is not necessary to prepare charging stock for an extraneous operation, the butene absorption unit will be useful to bring the iso-butane-butene ratio into proper balance for the alkylation step by absorbing or removing from the $C_4$ fractions any excess of butenes over and above that necessary for the alkylation step.

It will be seen that I have provided a process which permits flexibility in operation and provides for an adequate supply of iso-butane for the alkylation step without the necessity of using a separate isomerization unit. The process is designed to utilize a catalytic cracking unit in conjunction with an alkylation unit so that the butanes in the exit gas from the alkylation unit and from the crude oil fractionating and from the thermal cracking fractionating zones can be converted to iso-butane and an adequate supply of iso-butanes and butenes for the alkylation unit can be supplied. The process can be operated without the thermal cracking zone since by recycling the normal butanes from the alkylation reaction product to the catalytic cracking zone sufficient butenes as well as iso-butane can be obtained without necessity of charging the $C_4$ cut from the thermal cracking zone.

My invention contemplates the use of any catalytic process which is capable of producing reaction products rich in iso-paraffins. In charging the $C_4$ fractions to the catalytic cracking unit I prefer to charge them in liquid form although they may be charged in gaseous state. The $C_4$ fraction may or may not be absorbed in the gas oil prior to charging the latter to the catalytic cracking unit.

It will be understood that it may be necessary to supply pumps and other auxiliary equipment not shown on the drawing. The necessity for such auxiliaries will be apparent to those skilled in the art; therefore, no attempt has been made to show them on the drawing.

I claim:
1. A process for converting hydrocarbon oil into high octane number gasoline which comprises separating said oil into a plurality of fractions including gas oil and residuum, cracking said gas oil in the presence of a comminuted alumina-silica cracking catalyst, thermally cracking said residuum in a separate zone, separating a $C_4$ fraction from the reaction products of the thermal cracking step, charging the $C_4$ fraction to the catalytic cracking step, separating $C_4$ hydrocarbons from the reaction products of the catalytic cracking step, subjecting the $C_4$ hydrocarbons to alkylation, separating a normal butane and an isobutane fraction from the alkylation reaction products, recycling the isobutane fraction to the alkylation step and recycling said normal butane fraction to the catalytic cracking step.

2. Method in accordance with claim 1 in which the hydrocarbon oil charged to the process is crude petroleum oil, one of the fractions separated therefrom is a $C_4$ fraction and the last mentioned fraction is charged to the catalytic cracking step.

3. Method of converting crude petroleum oil into high octane gasoline comprising separating from said oil a $C_4$ fraction, a gas oil fraction and residuum, subjecting the gas oil, together with the $C_4$ fraction to cracking in the presence of a cracking catalyst selected from the group of natural and synthetic alumina-silica compositions, subjecting the residuum to thermal cracking, separating a $C_4$ fraction from the reaction products of the thermal cracking step and charging it to the catalytic cracking step, separating a $C_4$ fraction from the reaction products of the catalytic cracking step, separating the last mentioned fraction into a fraction rich in saturated hydrocarbons and a fraction rich in unsaturated hydrocarbons, charging regulated amounts of each fraction to an alkylation zone wherein alkylation of the butenes by means of iso-butane is effected, separating a normal butane fraction and an isobutane fraction from the reaction products of the alkylation step, recycling the isobutane fraction to the alkylation step and recycling the normal butane fraction to the catalytic cracking step.

CHARLES A. PORTER.

REFERENCES CITED

The following references are of record in the file of this patent:

UNITED STATES PATENTS

| Number | Name | Date |
|---|---|---|
| 2,224,840 | Story | Dec. 10, 1940 |
| 2,245,735 | Subkow | June 17, 1941 |
| 2,283,851 | Day | May 19, 1942 |
| 2,294,696 | Schmitkons | Sept. 1, 1942 |
| 2,214,455 | Egloff et al. | Sept. 10, 1940 |
| 2,240,134 | Egloff | Apr. 29, 1941 |
| 2,310,327 | Sweeney | Feb. 9, 1943 |
| 2,266,012 | D'Ouville | Dec. 16, 1941 |
| 2,286,504 | Parker | June 16, 1942 |
| 2,257,723 | Arveson | Oct. 7, 1941 |
| 2,343,770 | Hemminger | Mar. 7, 1944 |
| 2,211,747 | Goldsby | Aug. 13, 1940 |
| 2,358,150 | Cooke | Sept. 12, 1944 |

FOREIGN PATENTS

| Number | Country | Date |
|---|---|---|
| 530,250 | British | Dec. 9, 1940 |
| 538,307 | British | July 29, 1941 |

OTHER REFERENCES

Oil and Gas Journal, "Technique—Explained"; Mar. 9, 1942; pages 18 and 19.

The Refiner, "Continental Plant—Operation"; vol. 21, No. 1; Jan., 1942; pages 51–56, 58, 260–283.4.

Diagrammatic Flow Sheet Illustrating Processes Related to Production of Aviation Gasoline, in The Refiner; vol. 21, No. 10, Oct., 1942; Flow sheet between pages 140 and 141, 196–9.